United States Patent Office 3,429,356
Patented Feb. 25, 1969

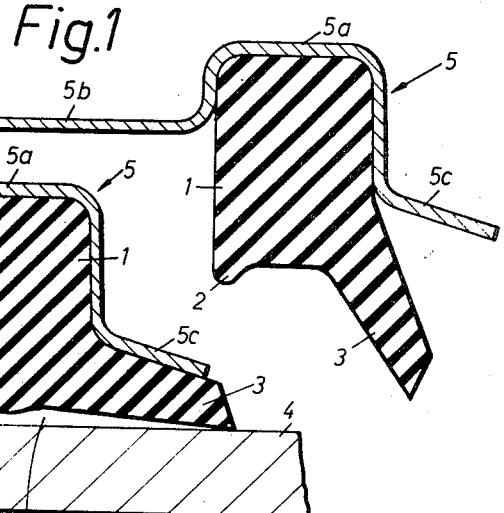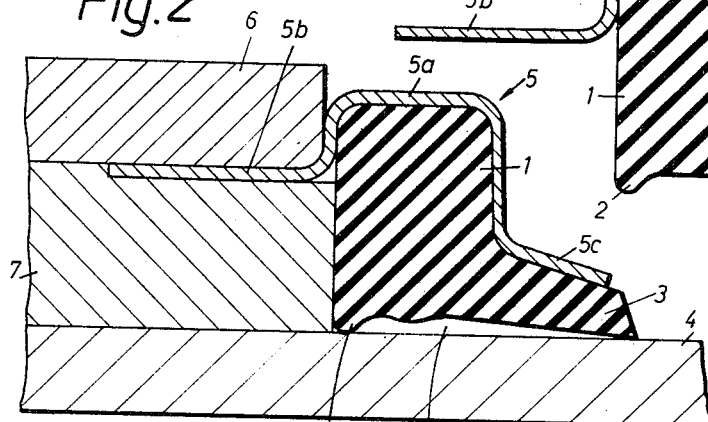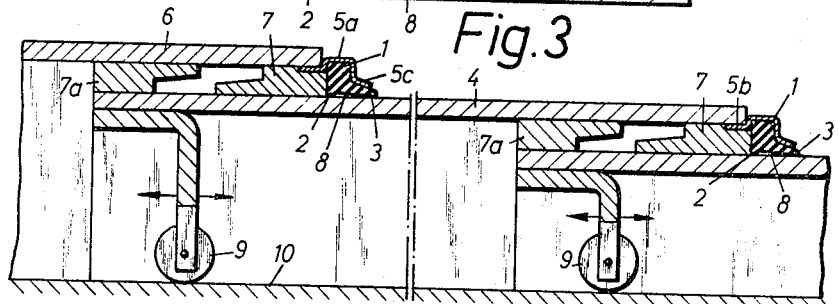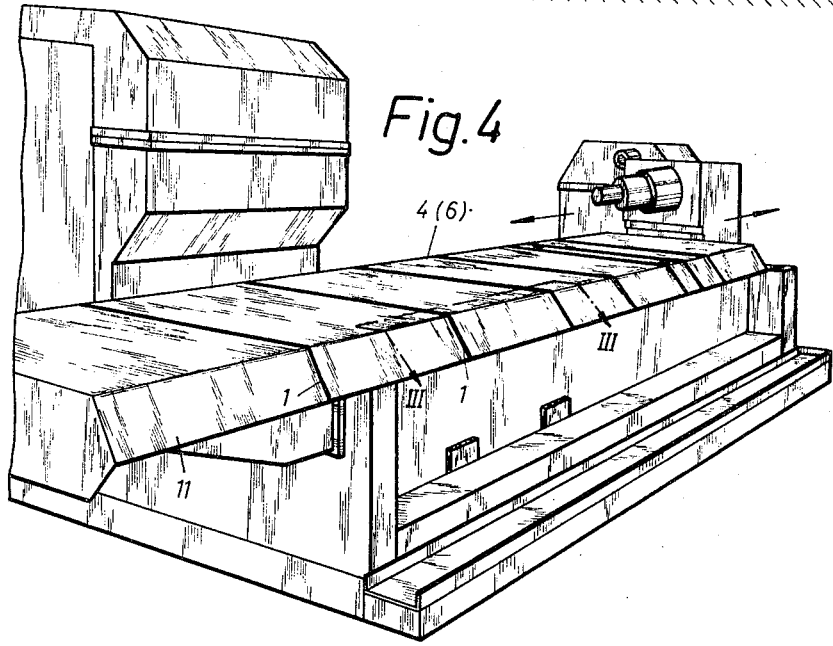

3,429,356
COVERING MEANS FOR GUIDING PATHS ON MACHINE TOOLS
Kurt Loos, Dreis-Tiefenbach (Sieg), and Friedrich Haschek, Weidenau (Sieg), Germany, assignors to Kabelschlepp G.m.b.H., Siegen, Wastphalia, Germany
Filed Jan. 6, 1967, Ser. No. 607,807
Claims priority, application Germany, Jan. 11, 1966, K 58,115
U.S. Cl. 160—223       5 Claims
Int. Cl. E06b 9/00, 3/92; E05d 15/06

ABSTRACT OF THE DISCLOSURE

An elastic wiper strip connected to an upper cover strip for wiping cooperation with a lower cover strip for use in connection with the covering means of guiding tracks, in which said wiper strip has its bottom side provided with a shorter inner sealing lip and a longer outer sealing lip arranged in spaced relationship to said shorter sealing lip in the longitudinal direction of the cover strips, said outer sealing lip when in assembled condition extending in the form of a substantially straight arm in the longitudinal direction of said strips and confining a chamber with the lower cover strip.

---

The present invention concerns covering means for guiding paths on machine tools or the like with a plurality of overlapping cover plates adapted to move one above the other. With covering means for guiding paths on machine tools, it is necessary to prevent chips, grinding dust or the like from entering into the space between the overlapping cover plates adapted to move one above the other, because otherwise the surfaces of the individual cover plates will, in the course of time, be scratched and the frictional resistance when pushing together the cover plates will increase continuously.

It is for this reason that heretofore known covering devices have employed wiper bars of pressed synthetic material, of steel, or brass, which are connected to the end of the respective upper cover plate and are inclined toward the surface of the lower cover plate to be wiped off. These known wiper bars or strips, however, have proved insufficient to assure an effective seal so that the back side of one wiper bar had to be additionally provided with a further wiper bar or strip of synthetic material. Covering devices of this type, however, have the drawback that when pulling apart the cover plates, the space between the two wiper bars or strips is compressed and when pushing the cover plates together again is opened. In this way, a slight vacuum was created between the two wiper strips, and additionally fluid and grinding dust was drawn into the space between the two wiper strips from where the liquid and grinding dust should be kept away.

It is, therefore, an object of the present invention to provide a covering device for guiding paths on machine tools, which will overcome the above mentioned drawbacks.

It is another object of this invention to provide covering means as set forth in the preceding paragraph, in which said covering means are provided with a wiper bar or strip which will assure an absolute grinding grain-free and water-tight displacement of the individual cover plates relative to each other.

These and other objects and advantages of the invention will appear more clearly from the following specification in connection with the acocmpanying drawings, in which:

FIGURE 1 is a section through a wiper strip or bar with a spring strip prior to the installation of these elements into a machine tool or the like.

FIGURE 2 shows the wiper strip and spring strip of FIG. 1 in installed condition.

FIGURE 3 is a section through a cutout of a covering device according to the invention with installed wiper strips, said section being taken along the line III—III of FIG. 4.

FIGURE 4 is a perspective view of a guiding path of a machine tool with a covering device according to the present invention.

The covering device for guiding paths on machine tools or the like, according to the present invention, which comprises a plurality of overlapping cover plates adapted to be moved one above the other, is characterized primarily by a wiper strip arranged on the free end of each upper cover plate and made of elastic material while the bottom side of said cover strip is provided with two serially arranged sealing lips of which the outer sealing lip rests under preload upon the surface of the adjacent lower cover plate.

According to a preferred embodiment of the invention, the top side of the wiper strip may over its entire length be engaged by a spring strip of U-shaped cross section. This spring strip is preferably of elastic material, for instance, spring steel. When this spring strip, while being assembled, is additionally inclined toward the surface of the adjacent lower cover plate, a further preload can be exerted on the sealing lip of the wiper strip. The two sealing lips together with the surface of the lower cover plate form a chamber in which dust and grinding dust will be collected which was still able to pass the outer preload sealing lip. This chamber is advantageously, from time to time, scavenged with a liquid, for instance, grinding oil, grinding water, or also air, so as to clean said chamber. It is, however, also possible without any difficulties to clean this chamber continuously by means of a liquid or by air so that an additional sealing effect will be obtained between the two cover plates.

Referring now to the drawing in detail, a wiper strip 1 of elastic or wear-resistant synthetic material, rubber or the like, has an approximately rectangular cross section. The bottom side of the wiper strip 3 is provided with two serially arranged lips 2, 3. The shorter sealing lip 2 determines the height of installation above the surface to be cleaned, of a lower cover plate 4, whereas the other sealing lip 3 in free, non-preloaded condition is approximately diagonally downwardly directed.

In assembled condition the sealing lip 3 is under preload and engages the surface of the lower cover plate 4 to be cleaned under light pressure. The front end of sealing lip 3 has a sharp edge so that grinding dust or other dust collected on the cover plate 4 can be reliably lifted off and pushed off.

The wiper strip 1 is inserted into a central portion 5a of a spring strip 5, said central portion 5a being of U-shaped cross section. As will be seen from the drawing, the spring strip 5 extends toward the rear where it forms a connecting strip 5b, whereas the oppositely located end above the sealing lip 3 forms a pressure strip 5c. By means of the connecting strip 5b, the spring strip 5 is connected between an upper cover plate 6 and a follower strip 7 arranged between the two cover plates 4, 6. In view of the inclination of the pressure strip 5c, it is possible to influence the preload of the sealing lip 3. For purposes of installing the connecting strip 5b, the follower strip 7 has its top side toward the upper cover plate 6 provided with a fold or groove into which the connecting strip 5b is clamped. The clamping effect between the upper cover plate 6 and the follower strip 7 is sufficient for fastening the spring strip 5. In assembled condition the wiper strip 1 rests on spring strip 5 and by means of its back also rests on follower strip 7. The front end of the sealing lip 3 of wiper strip 1 is held down by means of the pressure strip 5c.

Between the two sealing lips 2, 3 of the wiper strip 1, and the surface of the lower cover plate 4, there is formed a chamber 8 which may additionally be scavenged by liquid, for instance, grinding oil or grinding water, or also by air, in order to effect a further seal. Dust or grinding grain not pushed off by the sealing lip 3 will then be washed out by the liquid or blown out by the air.

The superimposed cover plates 4, 6 of a covering device are pulled apart by means of the follower strip 7 connected to the upper cover plate 6 and by means of the follower strip 7a connected to the lower cover plates 4. During this operation the respective lower cover plate 4 rests on the respective front end (in pulling direction) on a guiding path 10 by means of a roller 9. All cover plates 4, 6 of a covering device can be pushed together over an end cover plate 11.

As will be seen from the above, the arrangement and design of the wiper strip according to the invention will assure a complete seal by means of a single wiper strip only.

It is, of course, to be understood that the present invention is, by no means, limited to the particular construction described above, but also comprises any modifications within the scope of the appended claims.

What we claim is:

1. In combination with two overlapping cover strips, each having an outer end, for guiding tracks, especially of machine tools: an elastic wiper strip which is connected to the outer end of the upper one of said two cover strips and has one surface facing the lower one of said cover strips and being provided with an inner shorter sealing lip and an outer longer sealing lip arranged in spaced relationship to said shorter sealing lip in the longitudinal direction of said cover strips, said outer longer sealing lip extending in the form of a substantially straight arm in the longitudinal direction of said lower cover strip, and means holding said outer lip under preload in engagement with the lower one of said two cover strips.

2. A combination according to claim 1, in which said wiper strip consists of wear-resistant synthetic material.

3. A combination according to claim 1, in which the means holding said outer lip under preload in engagement with the lower one of said two cover strips includes a resilient spring strip of U-shaped contour extending partially around said wiper strip and having an arm in engagement with said outer lip and continuously urging the same against said lower one of said two cover strips.

4. A combination according to claim 3, in which said resilient spring strip consists of spring steel.

5. A combination according to claim 1, in which said sealing lips together with the surface of the lower one of said cover strips forms a chamber adapted to be flushed by fluid.

References Cited
UNITED STATES PATENTS

| | | | |
|---|---|---|---|
| 1,562,344 | 11/1925 | La France | 160—118 |
| 2,334,450 | 11/1943 | Siken | 160—11 |
| 3,068,045 | 12/1962 | Komenda | 49—489 |
| 3,120,682 | 2/1964 | Reffell | 160—193 X |

PETER M. CAUN, *Primary Examiner.*

U.S. Cl. X.R.

160—202